(12) United States Patent
Chobert et al.

(10) Patent No.: US 7,689,707 B2
(45) Date of Patent: Mar. 30, 2010

(54) EXCHANGING FILES BETWEEN COMPUTERS

(75) Inventors: Jean-Paul Chobert, Saint-Jeannet (FR); Angelo Rimoldi, Aicurzio (IT)

(73) Assignee: International Business Machines Corporation, Armonk, NY (US)

( * ) Notice: Subject to any disclaimer, the term of this patent is extended or adjusted under 35 U.S.C. 154(b) by 784 days.

(21) Appl. No.: 11/222,293

(22) Filed: Sep. 8, 2005

(65) Prior Publication Data

US 2006/0129561 A1 Jun. 15, 2006

(30) Foreign Application Priority Data

Dec. 9, 2004 (EP) .................................. 04300859

(51) Int. Cl.
*G06F 15/16* (2006.01)
*G06F 17/30* (2006.01)

(52) U.S. Cl. ......................................... 709/234; 707/10

(58) Field of Classification Search ........................ None
See application file for complete search history.

(56) References Cited

U.S. PATENT DOCUMENTS

| | | | | |
|---|---|---|---|---|
| 6,144,991 | A * | 11/2000 | England .................. | 709/205 |
| 6,389,473 | B1 * | 5/2002 | Carmel et al. ............. | 709/231 |
| 2002/0049853 | A1 * | 4/2002 | Chu et al. .................. | 709/237 |
| 2002/0052757 | A1 | 5/2002 | Lewis ......................... | 705/1 |
| 2002/0120607 | A1 | 8/2002 | Price et al. .................. | 707/1 |
| 2004/0015610 | A1 * | 1/2004 | Treadwell .................. | 709/246 |

FOREIGN PATENT DOCUMENTS

| | | | |
|---|---|---|---|
| JP | 11007405 | A2 | 6/1997 |
| JP | 2002132693 | A2 | 10/2000 |
| JP | 2002149466 | A2 | 11/2000 |
| WO | WO 03/105022 | * | 12/2003 |

* cited by examiner

*Primary Examiner*—Moustafa M Meky
*Assistant Examiner*—Clayton R Williams
(74) *Attorney, Agent, or Firm*—Katharyn E. Owen; Driggs, Hogg, Daugherty & Del Zoppo Co., LPA

(57) ABSTRACT

A data processing system having first and second data processing apparatuses and a data communication network supporting HTTP communications to which the first and second processing apparatuses are connected and a method of exchanging electronic files between the first and second processing apparatuses.

A Web server is provided running a Web application implementing a Web service accessible by the first and second processing apparatuses through Web browsers. The Web application receives a file from the first processing apparatus, and sends it to the second processing apparatus without storing it in a Web server local file. The first processing apparatus accesses the Web service via the respective Web browser, and uploads a selected file from a file system local thereto to the Web server; under responsibility of the Web application, the uploaded file is received at the Web server and, upon request by the second processing apparatus, is sent thereto.

15 Claims, 7 Drawing Sheets

(1ST OF 2)

(2ND OF 2)

EXCHANGING FILES BETWEEN COMPUTERS

TECHNICAL FIELD

The present invention relates generally to the field of electronic data processing, particularly to data processing systems, even more particularly to networks of computers (computer networks).

BACKGROUND ART

In the field of data processing systems there is often the necessity of making data, organized in one or more electronic archives or files, available to different computers, e.g. to the benefit of their respective users, which are not located physically close to one another.

Before the widespread diffusion of computer networks, such an operation typically involved the copying of the file(s) to be shared from the file system (e.g., from the local hard disk drive) of a given, first computer to a portable storage device, such as a floppy disk; transporting the floppy disk from the first computer to a second computer, not located physically close to the first computer and needing the data stored in the selected file(s); and copying the file(s) from the floppy disk into the file system (e.g., the local hard disk drive) of the second computer.

The development of computer networking has rendered the exchange of data between different computers much easier, less time-consuming, more reliable (portable storage supports like floppy disks frequently lose stored data) and also far more frequent.

One typical way of sharing data between different computers in a computer network is to define a common area in the file system of, e.g., one computer (for example, a user's Personal Computer—PC—or workstation, or a server computer in a computer network, such as a file server or an application server), and allow access to such common area to a number of different users (i.e., not only to the user of that computer). Files stored in that common area of the selected computer's file system can thus be accessed, through their PCs, by each one of the different users (at least, by those users that have been assigned the right to access that common area). This kind of solution is more typical in closed computer networks, such as Local Area Networks (LANs) and Wide Area Networks (WANs).

A solution like this has some drawbacks. For example, for security purposes, it is normally necessary to carefully define access rules, and manage access rights to the file system's common area by different categories of users. Such an access rule definition and access right management is burdensome, and normally requires the presence of a data processing system administrator.

Another solution that is nowadays commonly adopted for exchanging files between computer users located remotely from one another calls for exploiting electronic messaging services, particularly electronic mail (e-mail) services. Files can, in fact, be sent from a sender computer to one or more destination computers as attachments to an e-mail message. This kind of solution is quite common in open networks, such as in the Internet, but it can as well be adopted in close network environments, particularly of large dimensions.

Also, this solution has some drawbacks. E-mail services are inherently unreliable (the unreliability is intrinsic to the nature of the communication protocol used, the Transmission Control Protocol/Internet Protocol or TCP/IP). The delivery of e-mail messages is, in fact, not guaranteed, especially when, to get to the intended recipient, an e-mail message has to cross different e-mail service providers' domains. Moreover, e-mail service providers introduce often unpredictable restrictions on the size of the attachments to e-mail messages, and/or limits to the mailbox capacity, and filtering is more and more applied to some classes of e-mail attachments (such as to "zip" and "exe" files), which are automatically removed by the inbound mail server, for protection against virus attacks.

In the world of TCP/IP networks, and particularly in the Internet, another way of transferring files between networked computers relies on the File Transfer Protocol (FTP). The drawback in this case is that FTP server and FTP client programs are needed. Additionally, firewalls that are set up to protect local computer networks to open networks, such as the Internet, often block FTP file transfers. Moreover, unless an FTP server machine is provided for, FTP file transfer between two computers can be accomplished only if the sender and the destination computers are both online.

Specific software products (belonging to the class known as "business integration software" or "middleware") have also been developed, that are specifically intended for tying together other software applications, so that they can work together. The goal of business integration software is to connect different computer systems, diverse geographical locations, and dissimilar information technology infrastructures. A rather popular example of middleware is represented by IBM's MQSeries.

These products are very sophisticated and efficient, but rather complex and may result in too heavy a burden if the required task is merely to exchange files between different computer users. In addition, they need to be deployed and installed on the computers of all the users that need to exchange information, and this poses problems of time and costs. Also, maintenance and updating of the installed software is time-consuming.

Other solutions known in the art include solutions referred to as collaborative type solutions, such as those provided by IBM's Lotus software (e.g., Lotus Workplace versions 1.2 or 2.0), enabling a group of users to put files in a "teamroom" (in addition to other collaborative features, including the ability to chat). These solutions are powerful, efficient, rich of features (and, thus, relatively expensive), but are intended for exchanging information among a group of users, more than for user to user exchange. Moreover, also in this case it is necessary to deploy and install the software package onto the computers of the participating users.

SUMMARY OF THE INVENTION

In view of the state of the art outlined in the foregoing, the Applicants have observed that the known solutions for exchanging files between users of different computers located remotely from one another are not completely satisfactory in several respects, such as simplicity, reliability, costs, need of deploying and installing the required software tools, and maintenance.

Thus, the Applicants have tackled the problem of how to enable users of a data processing system, using different computers which are not located physically close to one another, to share information by exchanging files in an efficient, reliable but simple way, without the need of relatively complex (and expensive) application software tools.

According to an aspect of the present invention, a method of exchanging electronic files as set forth in claim 1 is provided.

In a data processing system comprising at least a first and a second data processing apparatus and a data communication network adapted to support HTTP communications to which the first and second data processing apparatuses are connectable, the method of exchanging files between the first data processing apparatus and the second data processing apparatus comprises providing a Web server running a Web application implementing a Web service accessible by the first and second data processing apparatuses through Web browsers executed thereon, said Web application being adapted to receive a file from the first data processing apparatus, and send the file to the second data processing apparatus without storing the file in a local file system of the Web server.

The first data processing apparatus can access the Web service via the respective Web browser, and upload a selected file from a file system local to the first data processing apparatus to the Web server.

Under responsibility of the Web application, the uploaded file is received at the Web server from the first data processing apparatus and, upon request by the second data Processing apparatus, the uploaded file is caused to be sent thereto.

The method according to the present invention has the great advantage of not being required to deploy and install specific software on the computers of the participating users. The availability, on the generic user's computer, of a Web browser, particularly any one of the common Web browsers, is sufficient. Nowadays, a Web browser is almost always installed on a computer because of the widespread use of the Internet. The file exchange method according to the present invention only requires the installation of a specifically designed Web application on one computer, the Web server to which any user computer can then connect, via its Web browser, to exchange files with other computers.

According to another aspect of the present invention, a data processing system as set forth in claim 7 is provided, comprising at least a first and a second data processing apparatus and a data communication network adapted to support HTTP communications to which the first and second data processing apparatuses are connectable, and a Web server accessible by the first and second data processing apparatuses through Web browsers executed thereon.

A Web application is executed on the Web server, the Web application implementing a Web service and being adapted to receive a file from the first data processing apparatus, and, upon request by the second data processing apparatus, to cause the file to be sent to the second data processing apparatus without storing the file in a local file system of the Web server.

Other aspects of the present invention encompass a computer program product adapted, when executed, to carry out the above method, and a computer readable medium whereon the computer program product is recorded.

BRIEF DESCRIPTION OF THE DRAWINGS

The features and advantages of the present invention will be made apparent by the following detailed description of some embodiments thereof, provided merely by way of non-limitative examples, description that will be conducted making reference to the annexed drawings, wherein.

DETAILED DESCRIPTION OF THE PREFERRED EMBODIMENT(S)

Figure 1:
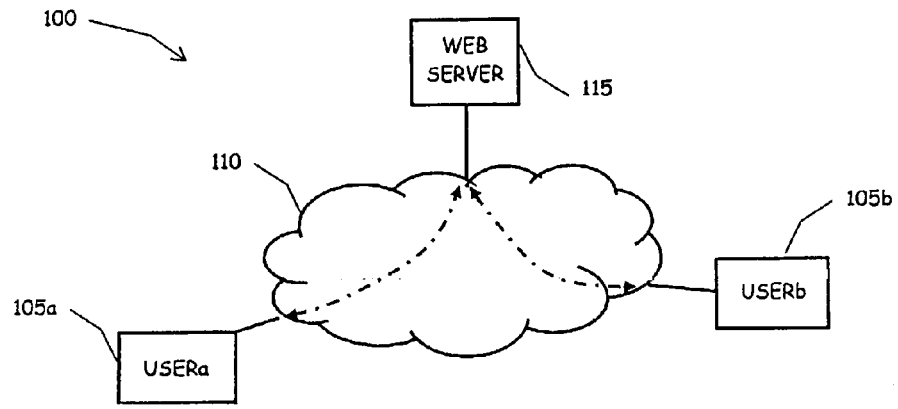
FIG. 1 schematically shows a data processing system scenario wherein the present invention is applicable.

With reference to FIG. 1, an exemplary scenario of a data processing system 100 wherein the present invention is applicable is depicted very schematically. The data processing system 100 is comprised of, for simplicity of explanation, two users' computers, indicated as 105a and 105b in the drawings, used, for example, by two users, say USERa and USERb.

The two computers 105a and 105b are, for example, Personal Computers (PCs) or workstations, but more generally they can be any kind of data processing equipment, such as a portable PC like a notebook or a laptop computer, a palmtop, a Portable Digital Assistant (PDA), a mobile communications terminal or the like (this elencation is clearly not exhaustive).

The two computers 105a and 105b may be located remotely from one another, wherein, by being remotely located, they are sufficiently far away so that it is impossible, impracticable or at least not expedient to exploit direct connection means (such as cables or infrared communication ports) for directly connecting one computer 105a to the other 105b in case their users need to exchange files.

It is pointed out that although only two users' computers 105a and 105b are considered in the present description, this is not at all limiting for the present invention, which is not restricted to any specific number of computers, and allows instead exchanging files between a potentially unlimited number of different users' computers.

A computer network 110 is provided, to which the two computers 105a and 105b are connected/connectable. For example, the computer network 110 may be the LAN of a Small Office/Home Office (SOHO) environment, or a LAN/WAN of a company, or a MAN (Metropolitan Area Network) or the like, or a network of several other networks, particularly the Internet.

The generic computer 105a or 105b is connected/connectable to the computer network 110 through a network access point, which, in the exemplary case of the Internet, typically is a so-called Point of Presence (POP) of an Internet Service Provider (ISP). To this purpose, the generic computer 105a or 105b may exploit, for example, a modem (e.g., an ISDN modem) and a dial-up connection, or an XDSL modem and an XDSL connection to the access point, or a Wireless LAN (WLAN) connection to the access point, such as a WI-FI—WIreless-FIdelity—connection. In case the generic computer 105a or 105b is connected to a local computer network, such as an Ethernet LAN, the connection of the computer to the network is usually accomplished via a Network Interface Adapter (NIA).

The data processing system 100 further comprises a server computer 115, which is connected to the computer network 110, particularly a Web server machine, i.e. a computer running a software adapted to serving Web pages, particularly HTML (HyperText Markup Language) documents, via the HTTP (HyperText Transfer Protocol) to Web clients.

Through the computer network 110, the two computers 105a and 105b can connect to the server computer 115. The two computers 105a or 105b are assumed to have installed therein and to be capable of executing a Web browser, i.e. a software allowing to connect to Web servers, and navigate and display Web pages.

Figure 2:
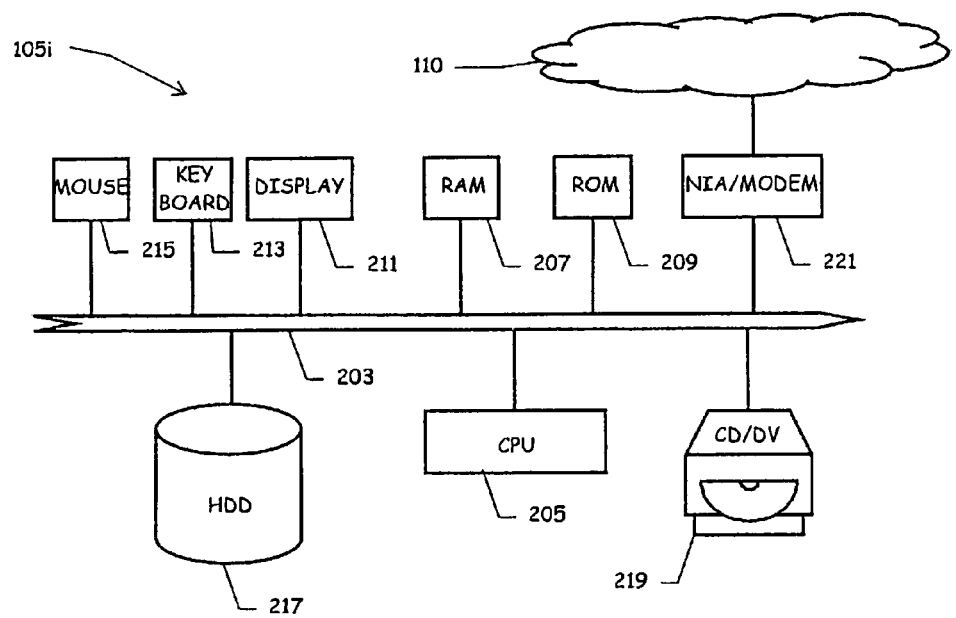
FIG. 2 schematically shows the structure of a generic computer of the data processing system of FIG. 1.

As schematically shown in FIG. 2, a generic computer 105i of the data processing system 100 comprises several functional units connected in parallel to a data communication bus 203, for example a PCI bus. In particular, a Central Processing Unit (CPU) 205, typically comprising a microprocessor, e.g. a RISC processor (possibly, the CPU may be made up of several distinct and cooperating CPUs), controls the operation of the computer 105i. A working memory 207, typically a RAM (Random Access Memory) is directly exploited by the CPU 205 for the execution of programs and for a temporary storage of data, and a Read Only Memory (ROM) 209 stores a basic program for the bootstrap of the computer 105i. The computer 105i may (and normally does) comprise several peripheral units, connected to the bus 203 by means of respective interfaces. Particularly, peripheral units that allow the interaction with a human user may be provided, such as a display device 211 (for example, a CRT, an LCD or a plasma monitor), a keyboard 213 and a pointing device 215 (for example a mouse or a touchpad). The computer 105i also includes peripheral units for local mass-storage of programs (operating systems, application programs, operating system libraries, user libraries) and data, such as one or more magnetic Hard-Disk Drivers (HDD), globally indicated as 217, driving magnetic hard disks, and a CD-ROM/DVD driver 219, or a CD-ROM/DVD juke-box, for reading/writing CD-ROMs/DVDs. Other peripheral units may be present, such as a floppy-disk driver for reading/writing floppy disks, a memory card reader for reading/writing memory cards, a magnetic tape mass-storage storage unit and the like.

For the connection to the computer network 100, the computer 105i is further equipped with a Network Interface Adapter (NIA) card 221, for example an Ethernet adapter, and/or a modem (indicated in the drawing by the same reference numeral 221 as the NIA), possibly an ISDN or an XDSL modem.

The server computer 115 may have a structure similar to the general one that is depicted in FIG. 2.

Figure 3:
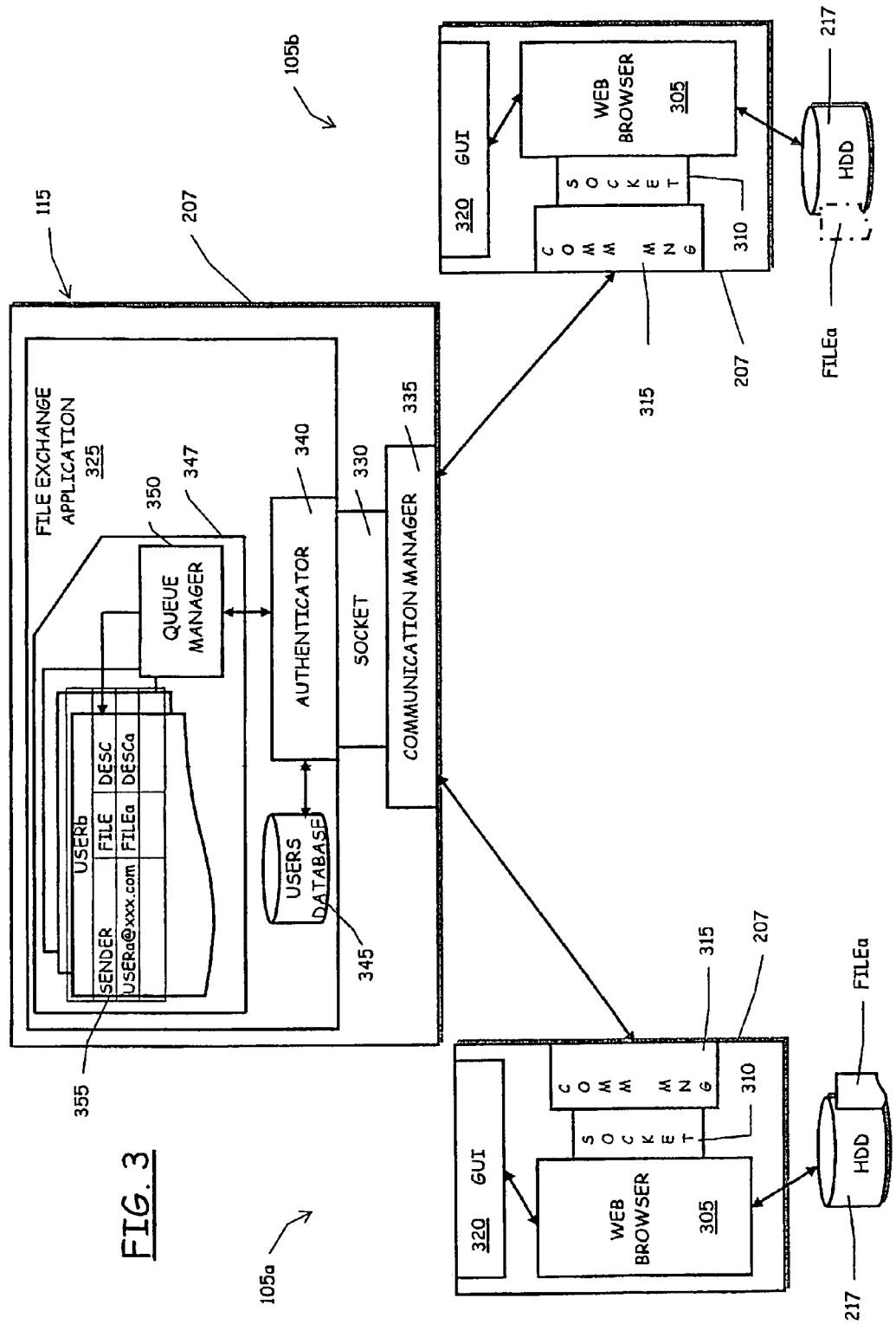
FIG. 3 pictorially shows the content of working memories of two generic users' computers and of a Web server computer of the data processing system of FIG. 1, while actuating a method according to an embodiment of the present invention.

FIG. 3 schematically depicts a partial content of the working memories 207 of the computers 105a and 105b and of the server computer 115, while carrying out a method according to an embodiment of the present invention. In particular, in FIG. 3 it is assumed that the computer 105a (assumed to represent the sender computer, i.e. the computer from which a file, stored in the local file system, e.g. on the local hard disk, is sent) and the computer 105b (assumed to represent the destination computer, i.e. the computer receiving the file sent by the sender computer) are both connected to (a file exchange Web application running on) the server computer 115 (it is however observed that the simultaneous connection of both the sender and the destination computers 105a and 105b to the server computer 115 is a condition that is not limited to the present invention, as will be described in greater detail later on).

In the sender or destination computers 105a or 105b, a Web browser 305 is assumed to be installed and running. The Web browser 305 is connected, through a socket 310, to a communication manager module 315 that manages the communication over the computer network 110, such module being, for example, responsible for handling the communication protocol (for example, the TCP/IP protocol). For the purposes of the present invention, any type of Web browser can be exploited for connecting the sender computer 105a and the destination computer 105b to the Web server 115, for example, Internet Explorer or Mozilla or Netscape. In general, any software adapted to allow a computer's user to connect to and navigate through the World Wide Web, and to display Web pages found on Web servers is suitable for the purposes of the present invention, which is thus not limited to the use of any particular Web browser. The Web browser 305 interacts with a Graphical User Interface (GUI) module 320, interfacing the Web browser with, e.g., the computer's display device 211, the keyboard 213, and the pointing device 215. The Web browser 305 also interacts with the local file system of the computer, assumed, for example, to be stored on the local hard disk of the computer, as schematized in the drawing. In particular, the Web browser 305 is capable of accessing the file system, so as to allow the user (through the GUI 320) to navigate through the system of folders and subfolders, selecting one or more files to be uploaded to the server computer 115, downloading files from the server computer 115 and storing the downloaded files in selected positions within the local file system.

In the server computer 115, a specifically designed file exchange management Web application software 325 is assumed to be running, for implementing a file exchange management Web service. The file exchange management Web application 325 is connected, through a socket 330, to a communication manager module 335, responsible for managing the communication over the network 110 with any computer that connects to the Web server 115, in particular the computers 105a and 105b.

The file exchange management Web application 325 preferably comprises an authenticator module 340, responsible for managing the authentication of users that connect, through their computers, to the Web server 115, and specifically to the file exchange management Web service. The authenticator module 340 interacts with a user's database 345, wherein details concerning the users that are registered for the file exchange Web service are stored. Shown schematically, and merely by way of example, the user's database 345 may contain, for the generic user, a record including fields like the user identifier, a user password, a flag indicating that the user is currently online/offline, as schematically represented in the following table (as mentioned in the foregoing, it is assumed that the two users USERa and USERb are both connected to the file exchange management Web application, but this is not limited thereto):

| USERid | PSW | ONLINE |
|---|---|---|
| USERa@xxx.com | abc | Y |
| USERb@yyy.com | def | Y |

It is observed that although the user's database 345 is depicted as residing in the working memory 207 of the server computer 115, this is not to be limiting, since the user's database might as well be stored in the local file system of the server computer 115, particularly on the hard disk(s) thereof.

The authenticator module 340 may include a user's database management part (not depicted in the drawing), responsible of the management of the user's database 345, particularly of the creation of new user's profile, of the deletion of obsolete user's profiles, and the like.

Preferably, in order to support an asynchronous file transfer, the file exchange management application 325 includes a queuing system 347, adapted to implement a queuing mechanism of the file exchange messages received from sender users' computers, like computer 105a in the present example, and intended for destination users' computers like computer 105b. In an embodiment of the present invention, the queuing system 347 includes a queue manager module 350, adapted to managing a file exchange message queue 355. In particular, the file exchange message queue 355 may, for example, include a message queue in respect of each one of the registered users, at least in respect of those registered users which has been the destination of a file exchange message originating from a registered sender user. The message queue for the generic destination user, such as the user USERb, may include as many records as the number of file exchange messages received by the Web server 115 from one or more sender users, like user USERa; Each of such records may, for example, include a field SENDER, intended to contain the identifier (e.g., USERa@xxx.com) of the sender (the identifier may be assigned to the user by the file exchange management Web application, at the time the user registers to the Web service), a field FILE wherein the file (e.g., FILEa) to be exchanged is stored, and a descriptor field DESC, intended to contain descriptor parameters (like DESCa, in the drawing) such as the file name, the file size, the time the file has been uploaded from the sender and put in the queue, the maximum time the files are kept in the queue, and the like. Exploiting these descriptor parameters, the queue manager 350 can implement management policies of the file exchange message queues limiting, for example, the size of the files that can be exchanged and/or the time the file exchange messages are kept in the queue before the intended destination user downloads them.

Expediently, according to an embodiment of the present invention, the queuing system 347 may be based on the "waiting Q" management part of the IBM's MQSeries middleware. However, it is pointed out that any queuing system may be relied upon, the invention, in its general terms, not being limited to any particular queuing system and implementation thereof.

Figure 4:
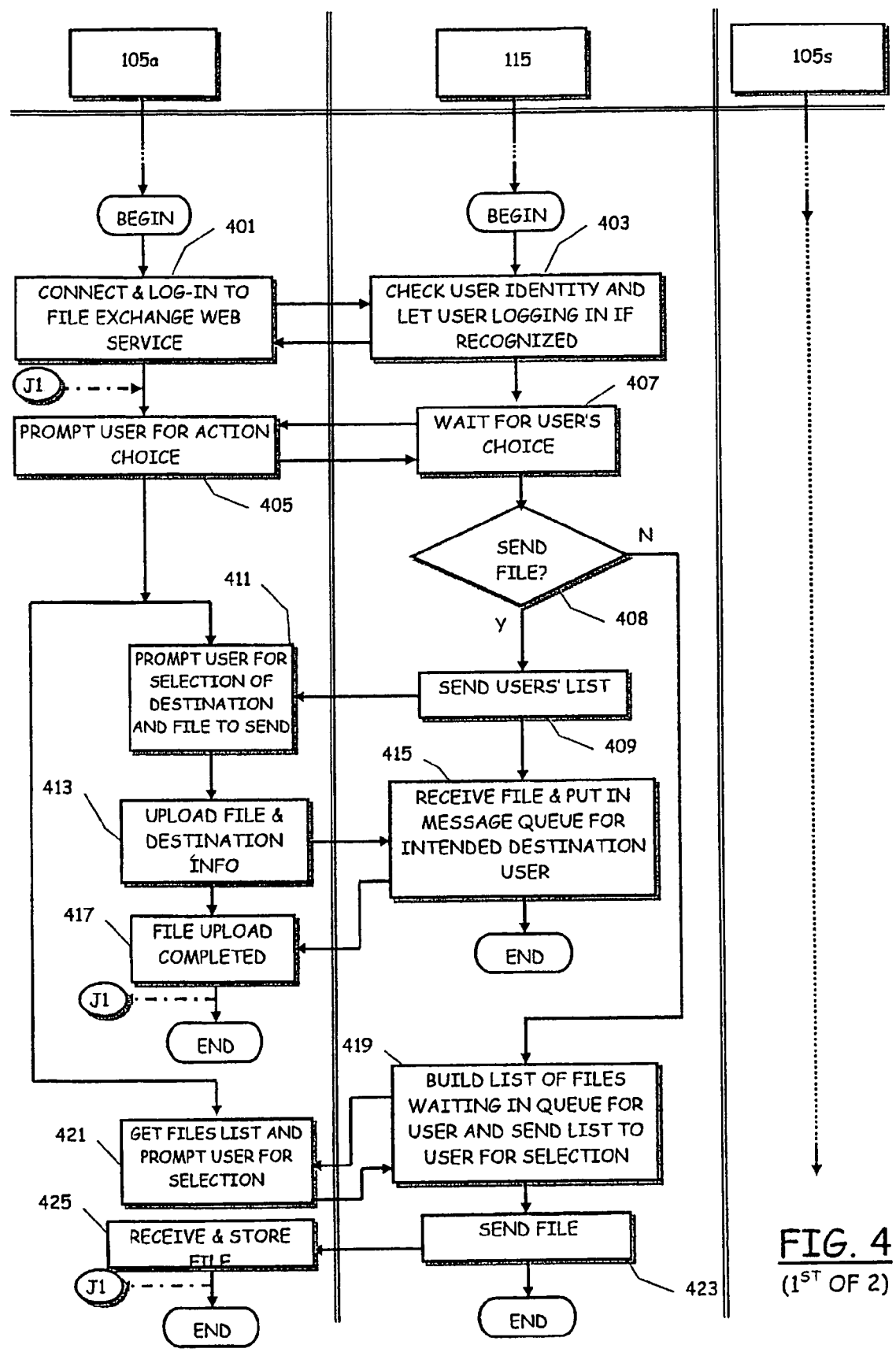
FIG. 4 is a schematic flowchart illustrating the method according to an embodiment of the present invention.
Figure 4:
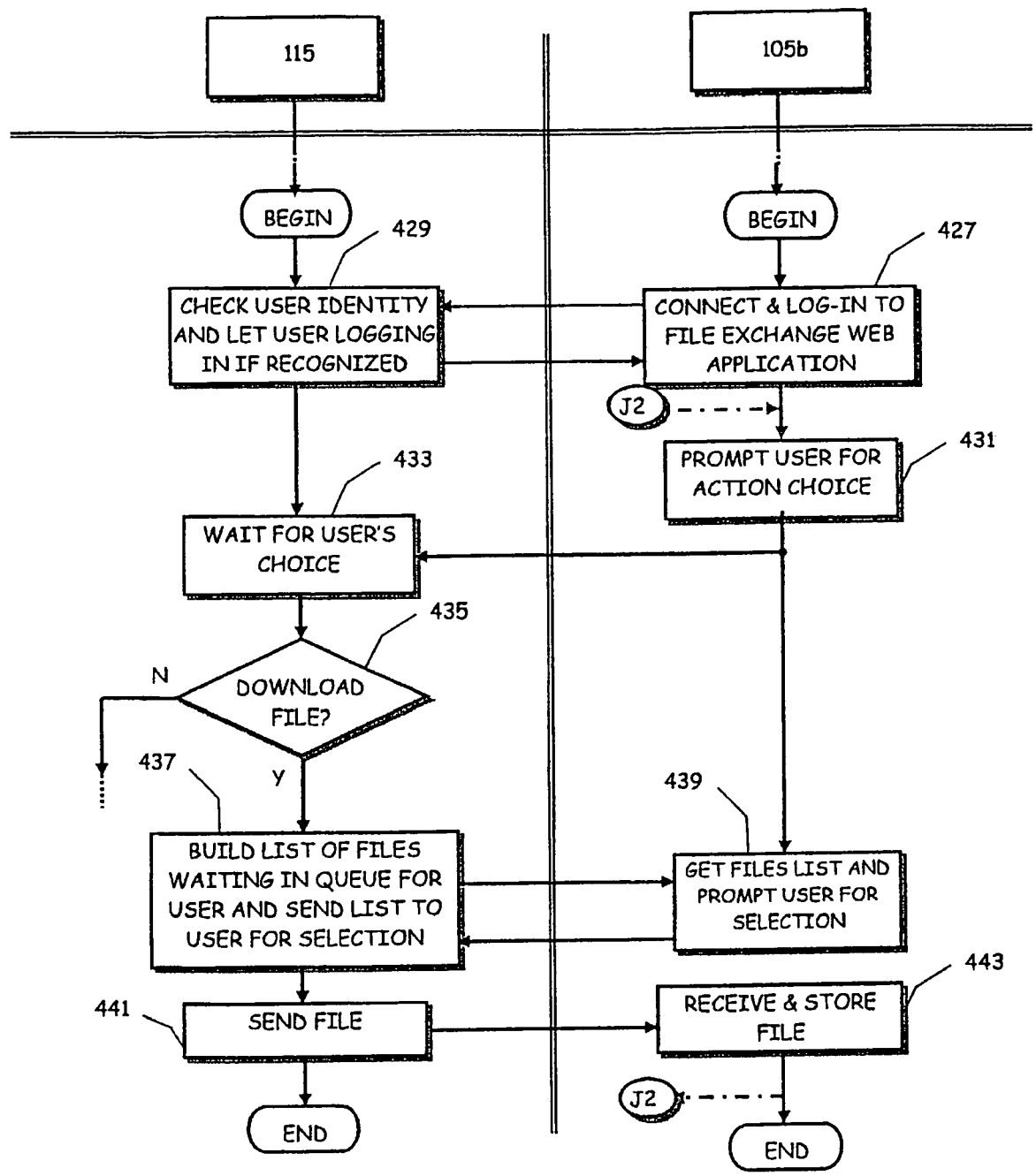

Hereinafter, a file exchange method according to an embodiment of the present invention will be described, making reference to the schematic, simplified flowchart of FIG. 4, and with the help of some exemplary windows displayed on the display device of the sender and destination computers, depicted in FIGS. 5A to 5F.

Let it be assumed that the user USERa of the computer 105a desires to share data with the user of computer 105b (located remotely), and that such data are stored in a file FILEa local to the computer 105a, i.e. in a file stored in the local file system of computer 105a, for example, in the local hard disk. Thus, the computer 105a acts as the sender computer, whereas the computer 105b plays the role of the destination computer.

The user USERa of the sender computer 105a initially has to connect to the server computer 115 and log-in to the file exchange Web service, implemented by the file exchange management Web application 325 running thereon (block 401). To do so, depending on the particular situation, the user of the sender computer 105a may, for example, need to establish a dial-up phone connection with a respective ISP, accessing the Internet, launch the Web browser 305, and enter the World Wide Web address (the URL) of the server computer 115 or, in case where the computer network 110 is a LAN, it may, for example, be sufficient to reach, via the Web browser 305, the Web server 115, which is the computer, within the LAN 101, under which the file exchange Web application runs.

After the sender computer 105a has reached the server computer 115, in order to log-in to the file exchange Web application, the sender user USERa may be requested to enter a user name and a password, for example, assigned thereto upon registering for the Web service. For example, the Web browser at the sender computer may be caused (by the authenticator 340) to display to the user USERa a window, such as the exemplary one depicted in FIG. 5A, requesting him/her to enter the respective user name and password. The authenticator 340, looking at the user's database 345, checks the user name and password entered by the sender user USERa to ascertain whether he/she is registered to the file exchange Web service and, in the affirmative case, the server computer 115 lets the sender user USERa log-in the file exchange Web service (block 403). Preferably, when the generic user has logged in to the file exchange service, the flag field "ONLINE" in the respective record in the user's database 345 is set to "Y", thereby indicating that such a user is currently online.

Figure 5A:
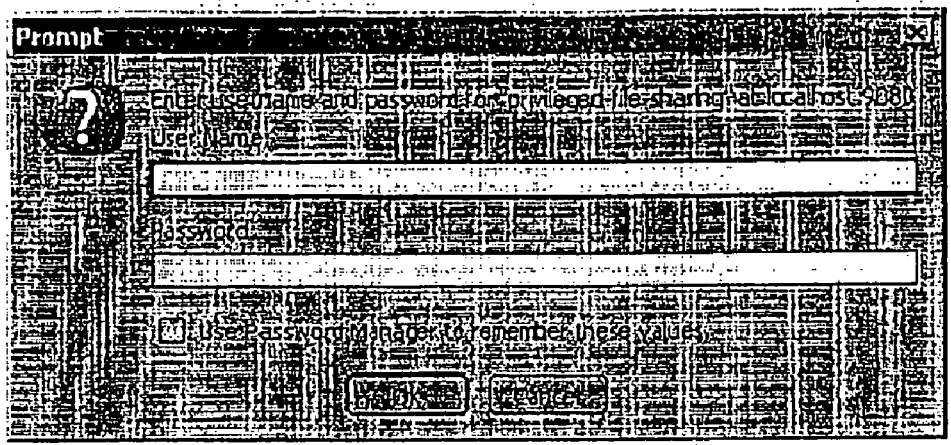
FIGS. 5A to 5F are exemplary windows that are displayed at the users' computers.
Figure 5B:
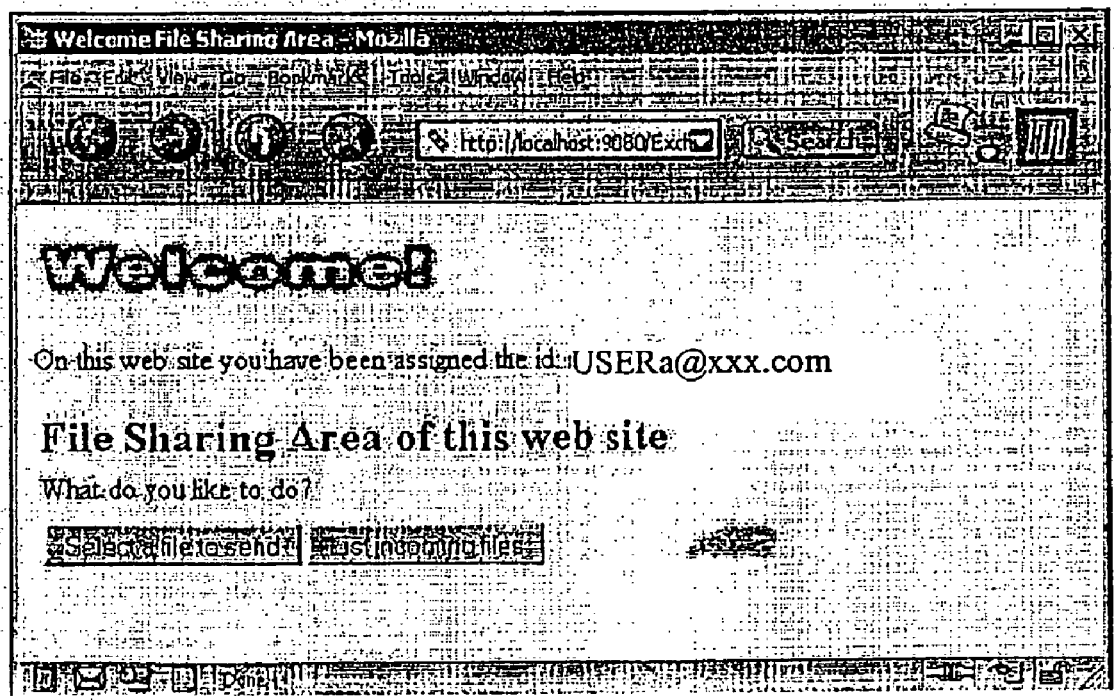
Figure 5C:
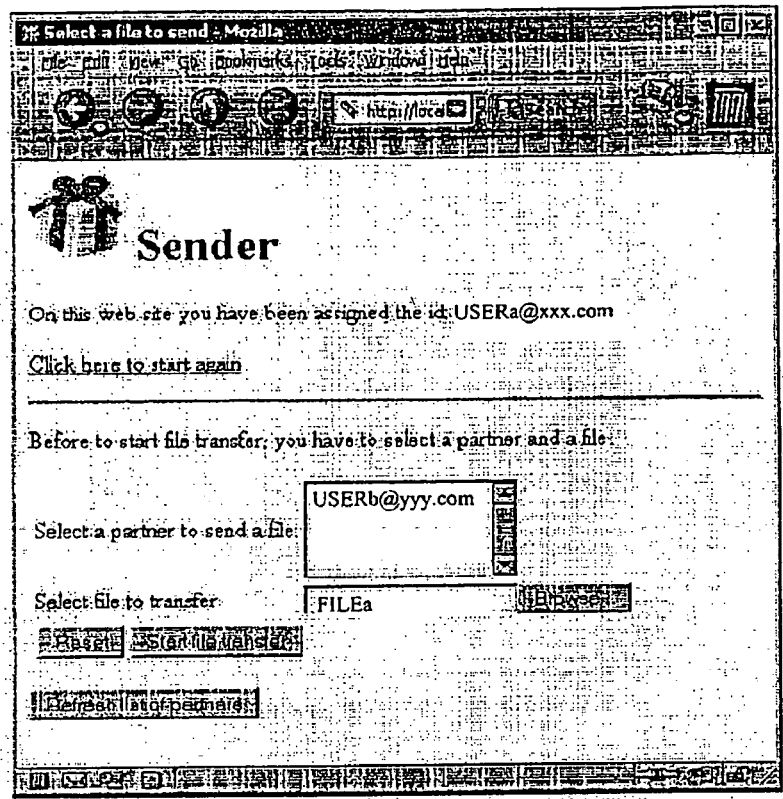
Figure 5D:
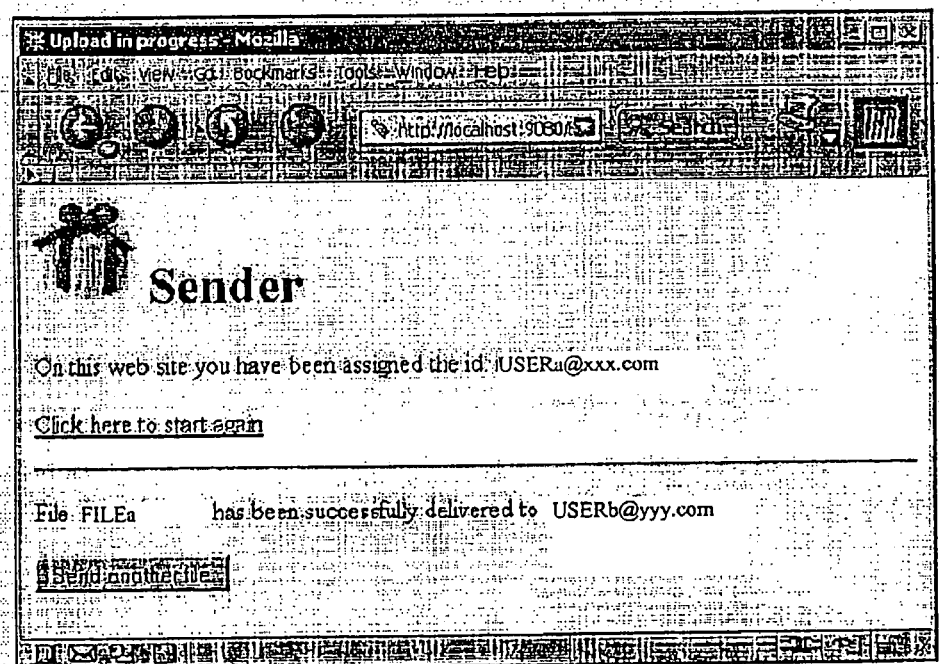

When the (authenticator 340) server computer 115 lets the sender computer 105a log-in to the file exchange Web service, the Web browser 305 running on the sender computer 105a may be caused to display to sender user USERa a welcome window like the exemplary one depicted in FIG. 5B, prompting the sender user USERa to choose which action to perform, i.e. whether he/she wants to send a file (possibly, more than one file) to an intended destination user (possibly, to more than one destination user), or to check for and list any incoming file(s) directed to him/her by other users, and waiting in the message queue 355 at the server computer 115 (block 405). The server computer 115 waits for the user's choice of action (block 407) (it is worth underlying that by "waits for" there is meant that the communication session established between the sender computer 105a and the server computer 115 is put in wait; while waiting, the server computer 115 will typically be able to perform many other actions, in particular opening other sessions with other users of the file exchange Web service).

In case the sender user USERa selects as an action to send a file to a destination user (exit branch Y of decision block 408), the file exchange management Web application 325 sends to the Web browser 305 at the sender computer 105a the list of the users registered for the file exchange service, obtained from the users' database 345 (block 409), and causes the Web browser 305 to prompt the user USERa to select the intended destination user(s), and the file(s) to send (block 411). In particular, in an embodiment of the present invention, the users' list sent to the Web browser of the sender user may include only those users that are online at that moment (i.e., users that have logged in to the file exchange service, identified by a "Y" in the respective "ONLINE" field). In this case, the sender user USERa may send a file to an intended destination user, say USERb, only provided that such a destination user is online at that moment. More generally, the list of users sent to the Web browser 305 of the sender user USERa includes all the users registered to the file exchange Web service and, in this case, the sender user USERa may select to send a file also to users that are not online at that moment. It is also observed that in both cases, for reasons of privacy, the users' list sent to the sender user USERa may be restricted to those users that belong to the same group as the sender user, users belonging to different groups not being displayed to the sender user. In order to select the file(s) to be sent to the intended destination user, the sender user USERa can either directly input the file name(s) (with the proper path), or it can access the local file system of his/her computer (stored in the local drives thereof), navigate therethrough and select the desired file(s).

Once the sender user has selected the destination user(s), for example, the user USERb, and the file(s) to be sent thereto, for example, the file FILEa, he/she starts-the upload to the Web server 115 of the selected file, together with the information allowing the file exchange management Web application 325 to identify the destination user (block 413). At the Web server 115, the incoming message is sent to the file queuing system 347. In particular, when the generic user, like the user USERa, logs-in to the file exchange management Web application 325 and chooses to upload a file, the file exchange management Web application 325 acts as a "sender" client of the queuing system. The queue manager 350 gets the indication of the destination user USERb and identifies, in the system of queues 355, the proper message queue corresponding to that destination user; in particular, a new record is created in the queue, and the queue manager 350 saves the incoming file FILEa (possibly, portions thereof received in different messages sent by the user USERa) in the prescribed field, together with the indication of the sender user USERa and with respective descriptor parameters (block 415). It is observed that typically the file is received in several file fragments, and the different fragments as received are placed in the queue of the intended destination user. After this, the Web browser 305 at the sender user computer 105*a* may be caused to display to the sender user USERa that the file upload process has been successfully completed (block 417), for example, by displaying a window like the exemplary one depicted in FIG. 5D. The operation of the sender computer 105*a* can now return to block 405, and the sender user USERa may choose to perform another file transfer to the same or to a different destination user, or to inspect the presence of files on the Web server directed to him/her (as represented schematically by the dash-and-dot lines and connector J1 after block 417), or the session between the sender computer 105*a* and the Web server 115 may terminate.

Back to block 405, if the action selected by the user USERa is not "Select a file to send", but rather "List incoming files" (exit branch N of decision block 408), the queue manager 350 accesses the queue 355 so as to build a list of files uploaded to the Web server and intended to be delivered to the user USERa; The list (preferably including the file names and the identifier of the users that uploaded them) is sent to the Web browser 305 of the user USERa (block 419). The Web browser 305 running on computer 105*a* is then caused to display the file list and prompt the user USERa for selection of the files to be downloaded (block 421). An exemplary window displayed to the user USERa would look like that depicted in FIG. 5E, which, however, refers to the download of files by the destination computer 105*b*, described later on.

The file exchange management Web application 325 receives from the Web browser 305 running on the computer 105*a* the indication of the file(s) selected by the user USERa for being downloaded, and starts a file download so as to obtain the content of the selected file(s) from the queue 355 and download it to the computer 105*a* (block 423). The computer 105*a* receives the file content and stores it in the local file system (block 425). Expediently, the file exchange management Web application downloads the files exploiting an "UNKNOWN" MIME (Multipurpose Internet Mail Extension) type, so as to force the Web browser 305 to prompt the user USERa to save the file in the local file system (an exemplary window will look like the one depicted in FIG. 5F).

Hereinafter, the operations allowing the intended destination user USERb, at the computer 105*b*, to download the file FILEa sent to him/her by the sender USERa will be described. In a way totally similar to what has been previously explained, the user USERb of the destination computer 105*b* firstly has to connect to the server computer 115, and log-in to the file exchange Web service implemented thereon (block 427). As in the former case, the user USERb of the destination computer 105*b* may, for example, need to establish a dial-up phone connection with a respective ISP, launch the Web browser 305, and enter the World Wide Web address (the URL) of the server computer 115, or, in case where the computer network 110 is a LAN, it may, for example, be sufficient to reach, via the Web browser 305, the Web server 115, which is the computer, within the LAN 110, under which the file exchange Web application runs.

After the computer 105*b* has reached the server computer 115, in order to log-in to the file exchange management Web application, the sender user USERb is requested to enter the respective user name and password. As described in the foregoing, the destination user is, for example, displayed in the window depicted in FIG. 5A, requesting him/her to enter the respective user name and password (block 427). The (authenticator 340 at the) server computer 115, looking at the user's database 345, checks the user name and password entered by the user USERb to ascertain whether he/she is registered to the file exchange Web service and, in the affirmative case, the server computer 115 lets the user log-in to the file exchange service. The flag field "ONLINE" in the respective record in the user's database is preferably set to "Y", thereby indicating that the user USERb is online (block 429).

When the server computer 115 lets the destination computer 105*b* log-in to the file exchange Web service, the Web browser 305 running on the destination computer 105*b* is caused to display to the user USERb the welcome depicted in FIG. 5B, prompting him/her to choose which action to perform, i.e. send a file to an intended destination user, or check for any incoming file(s) directed to him/her and waiting in the message queue at the server computer 115 (block 431). The server computer 115 waits for the user's choice of action (block 433).

Figure 5E:
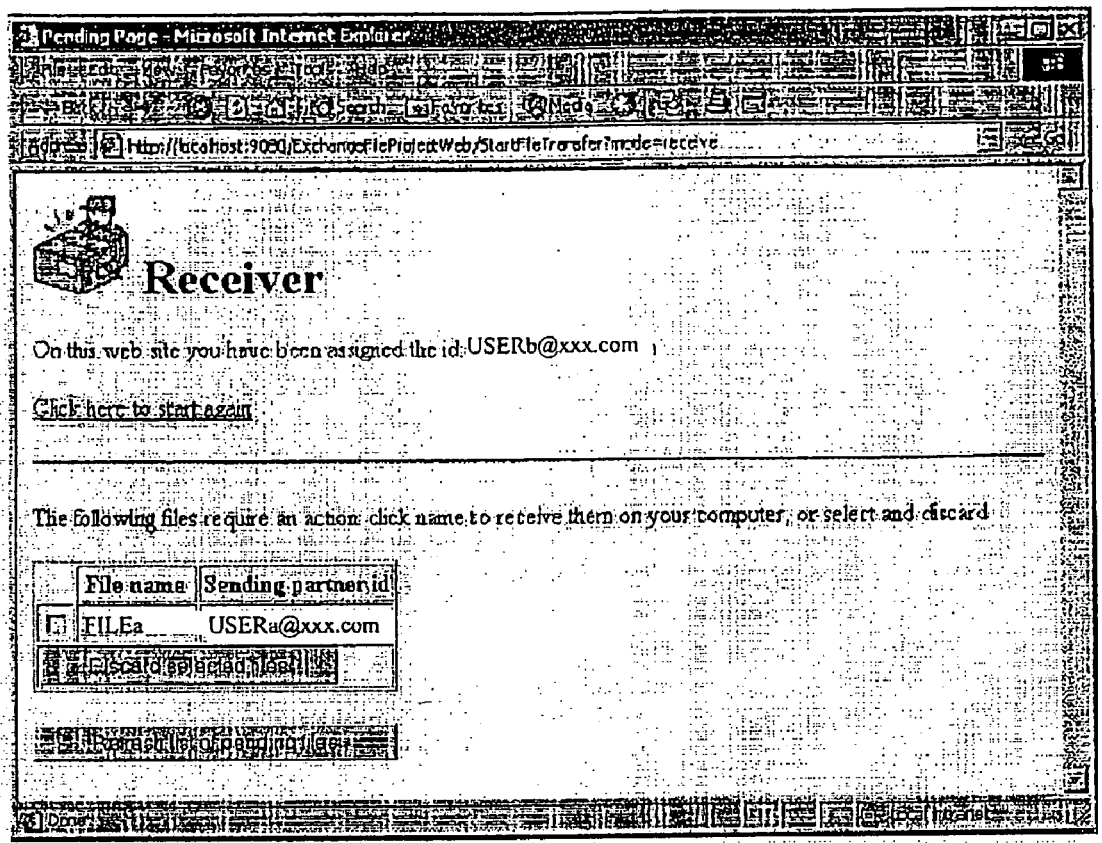

Let it be assumed that the user USERb wants to check for any incoming file(s) (exit branch Y of decision block 435— the case wherein the user USERb chooses to send a file to another user has already been described in the foregoing in connection with user USERa and will not be described again). In particular, when the user USERb logs-in to the file exchange management Web application 325 and chooses to download a file, the file exchange management Web application 325 acts as a "receiver" client of the queuing system. The queue manager 350 accesses the queue 355 (that part of the queue relating to the user USERb) so as to build a list of the files received at the Web server 115 and waiting to be delivered to the user USERb. The list (including the file names and, preferably, the identifiers of the users that sent them) is sent to the Web browser 305 of the computer 105*b* of the user USERa (block 437). The Web browser 305 then displays to the user USERb the file list and prompts the user for selection of the files to be downloaded (block 439). The exemplary window displayed to the user USERb is depicted in FIG. 5E, from which it results that file FILEa, uploaded by user USERa, waits in the queue to be downloaded.

Figure 5F:
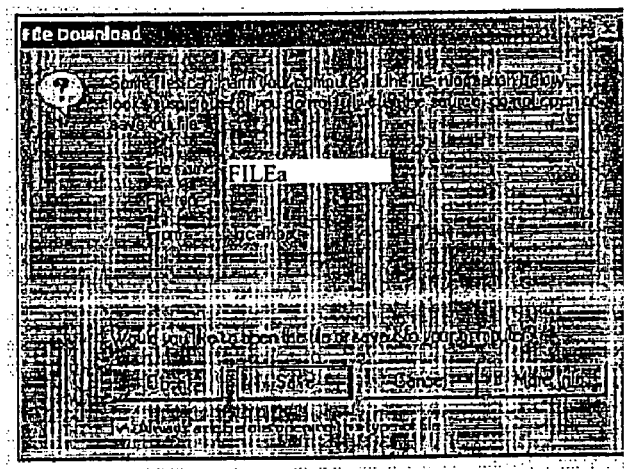

The file exchange Web application receives from the Web browser 305 running on the computer 105*b* the indication of the file(s) selected by the user USERb for being downloaded, and starts a file download so as to obtain the content of the selected file(s) from the queue 355 and download it to the computer 105*b* (block 441). In particular, the queue manager 350 retrieves the file (possibly, successive portions of it) from the queue, and forwards it to the Web browser at the destination computer 105*b*. The computer 105*b* receives the file content and stores it in the local file system (block 443). The Web browser 305 prompts the user USERb to select the saving of the file in the local file system (the exemplary window that is displayed is depicted in FIG. 5F).

The downloaded file(s) may be removed from the queue of the file exchange Web application, or they can be left in the queue, possibly with an indication of the fact that they have already been downloaded. The choice of whether to delete the downloaded files from the queue or to maintain them in the queue (possibly, for a prescribed time) may be left to the destination user.

It is observed that the provision of a queuing system, with message queues in respect of the file exchange Web service users and a queue manager, is considered preferred, but is not essential. In an embodiment of the present invention, the queuing system may be dispensed of, and a less powerful but nevertheless working file exchange Web application allows transferring files from a sender computer to one or more destination computers through the respective socket connections of the Web browsers to the Web server, provided that both the sender and the destination computers are simultaneously online (i.e., both connected at the same time to the Web server), and the file transfer is synchronous (in particular, the upload rate is equal to the download rate). The provision of a queuing system makes the file exchange Web application more flexible, allowing asynchronous transfer of files between users that need not be simultaneously online. In particular, with a queuing system, if both the sender and the destination users are online, in the file exchange management Web application there are two concurrent threads—a "sender" client and a "receiver" client—while the first thread, i.e. the sender client, uploads the file (possibly, in fragments) and the queue manager stores it in the proper queue; the second thread, i.e. the receiver client receives from the queue manager the file fragments and downloads them to the Web browser on the destination computer 105b. In other words, the queue manager can queue the file fragments as they are received by the sender user computer, place them in the queue and send the file fragments retrieved from the queue to the destination user computer or, should the destination user computer not be online, the file sent by the sender user computer can be fully uploaded and keep the uploaded file in the queue until the destination user logs in and decides to download the file.

It is worth remarking that, according to an embodiment of the present invention, the file(s) to be exchanged, once uploaded to the server computer 115, are not stored in the file system of the server computer, but either the file fragments, as received by the sender computer, are directly forwarded to the destination computer, if both of them are online, or the file fragments received from the sender computer are put in a message queuing system. Thus, in order to download the intended file(s), the destination users need not access the file system (or even a part thereof) of the server computer. It is more like the sender and the destination computers are connected through the respective Web browsers and socket connections. Thus, it is not necessary to define any common area in the file system of either one of the sender and destination computers, nor of the server computer, and, thus, the complications involved in setting up a common, shared file system area (such as management of access rights) are avoided.

Thanks to the present invention, files can be exchanged between different computers, located more or less remotely from each other, in a very simple and straightforward way, without the necessity of defining common, shared file system areas on either the sender or the destination computer. Also, it is not required to deploy, install and maintain software on all the computers participating in the service. It is sufficient to set-up the Web service at a Web server.

The size of files that can be exchanged is limited only by the space available on the sender and destination computers, and not, for example, by the space "leased" on the server, as in the case of file attachment for an e-mail service. The file transfer flows as if the sender computers of USERa and USERb and the destination computer are connected through a cable or coupled via an infrared port.

Although the present invention has been disclosed and described by way of some embodiments, it is apparent to those skilled in the art that several modifications to the described embodiments, as well as other embodiments of the present invention are possible without departing from the scope thereof as defined in the appended claims.

For example, it may be provided that whenever a user logs in to the file exchange Web service, the file exchange Web application software running at the Web server readily informs the user of the existence of files in the respective queue that have to be downloaded. The user may in that case either choose to look at the list of files in the queue, or ignore the message and proceed as desired.

As a further possibility, a signalling service may in addition be implemented at the Web server, by means of which when a file is received at the Web server intended for a given user, the file exchange Web service sends a notification to the intended destination user's computer, for example an e-mail message, informing him/her of the presence of files to be downloaded.

Additionally, an acknowledgement of receipt mechanism can be implemented, by means of which the Web server notifies the sender that the file intended for a destination has been downloaded.

What is claimed is:

1. A method of exchanging electronic files, comprising:
   providing a web server configured by a web application to serve hypertext markup language web pages through a hypertext transfer protocol data communication network to a sender client running a sender client web browser and a receiver client running a receiver client web browser;
   wherein, if the sender client and the receiver client are connected at the same time to the web server and an upload rate of the sender client is synchronous to a download rate of the receiver client, the web server is configured to transfer a plurality of successive fragments of a file concurrently with their receipt from a socket connection of the sender client web browser to a socket connection of the receiver client web browser without first uploading an entirety of the file to the web server and without storing the plurality of successive file fragments in a local file system of the web server;
   wherein the web server is configured by the web application to:
      provide a queuing system for file exchange messages received from the sender client and intended for the receiver client, the queuing system without access to the web server file system and comprising a sender client message queue and a receiver client message queue;
      upload and queue the plurality of successive file fragments received from the sender client web browser socket connection into the receiver client message queue;
      if both the sender client and the receiver client are online and upon request by the receiver client, cause each of the uploaded file fragments to be directly forwarded to the receiver client web socket concurrently with receipt from the sender client web browser socket; and
      if the receiver client is not online, fully upload a file comprising the plurality of successive file fragments, keep the uploaded file in the receiver client message queue without storing the uploaded file in the web server file system, and download the uploaded file to the receiver client web browser socket in response to a user log in and download request;

wherein the receiver client web browser socket is enabled to download the uploaded file and the uploaded file fragments from the receiver client message queue without gaining access rights to the web server file system or to the sender client local file system and without requiring a defining of a common area in the sender client local file system, the receiver client local file system or the web server file system.

2. The method of claim 1, wherein the web server is further configured by the web application to provide an authenticator module responsible for managing authentication of users that connect through the sender client or the receiver client to the web server by interacting with a user's database comprising registered user fields, the user fields including at least one of a user password and a flag indicating that a user is currently online or offline.

3. The method of claim 2, wherein the web server is further configured by the web application to provide a queue manager module adapted to manage the queuing system;

wherein the receiver client message queue includes each of a plurality of records for each of a plurality of file exchange messages received by the web server from one or more sender clients, each of the records including a sender field containing a user identifier, a file field indicating where the uploaded file or file fragments are stored, and a file descriptor field indicating at least one of a file name, a file size, a time of upload from the sender client to the receiver client message queue and a maximum time to be kept in the queue.

4. The method of claim 3, wherein the queue manager is configured to limit a file size of the uploaded file or of the file comprising the uploaded file fragments that can be exchanged through the receiver client message queue to a size of a space available on at least one of the sender client local system and the receiver client local system.

5. The method of claim 4, wherein the queue manager is configured to limit a time that file exchange messages may be kept in the receiver client message queue before an intended destination user downloads the uploaded file or the file comprising the uploaded file fragments.

6. A method for exchanging electronic files, comprising:
producing computer executable program code;
storing the computer executable program code on a computer readable storage medium; and
deploying and executing the computer executable program code on a computer system from the computer readable storage medium, the program code comprising instructions which, when executed on the computer system, cause the computer system to:
serve hypertext markup language web pages through a hypertext transfer protocol data communication network to a sender client running a sender client web browser and a receiver client running a receiver client web browser;
wherein, if the sender client and the receiver client are connected at the same time to the computer system and an upload rate of the sender client is synchronous to a download rate of the receiver client, the computer system is configured to transfer a plurality of successive fragments of a file concurrently with their receipt from a socket connection of the sender client web browser to a socket connection of the receiver client web browser without first uploading an entirety of the file to the computer system and without storing the plurality of successive file fragments in a local file system of the computer system;

provide a queuing system for file exchange messages received from the sender client and intended for the receiver client, the queuing system without access to the web server file system and comprising a sender client message queue and a receiver client message queue;

upload and queue the plurality of successive file fragments received from the sender client web browser socket connection into the receiver client message queue;

if both the sender client and the receiver client are online and upon request by the receiver client, cause each of the uploaded file fragments to be directly forwarded to the receiver client web socket concurrently with receipt from the sender client web browser socket; and if the receiver client is not online, full upload a file comprising the plurality of successive file fragments, keep the uploaded file in the receiver client message queue without storing the uploaded file in the web server file system, and download the uploaded file to the receiver client web browser socket in response to a user log in and download request;

wherein the receiver client web browser socket is enabled to download the uploaded file and the uploaded file fragments from the receiver client message queue without gaining access rights to the web server file system or to the sender client local file system and without requiring a defining of a common area in the sender client local file system, the receiver client local file system or the web server file system.

7. The method of claim 6, the program code comprising instructions which, when executed on the computer system, further cause the computer system to provide an authenticator module responsible for managing authentication of users that connect though the sender client or the receiver client to the computer system by interacting with a user's database comprising registered user fields, the user fields including at least one of a user password and a flag indicating that a user is currently online or offline.

8. The method of claim 7, the program code comprising instructions which, when executed on the computer system, further cause the computer system to provide a queue manager module adapted to manage the queuing system;

wherein the receiver client message queue includes each of a plurality of records for each of a plurality of file exchange messages received by the computer system from one or more sender clients, each of the records including a sender field containing a user identifier, a file field indicating where the uploaded file or the file fragments are stored, and a file descriptor field indicating at least one of a file name, a file size, a time of upload from the sender client to the receiver client message queue and a maximum time to be kept in the queue.

9. The method of claim 8, the program code comprising instructions which, when executed on the computer system, further cause the computer system queue manager to limit a file size of the uploaded file or of the file comprising the uploaded file fragments that can be exchanged through the receiver client message queue to a size of a space available on at least one of the sender client local system and the receiver client local system.

10. The method of claim 9, the program code comprising instructions which, when executed on the computer system, further cause the computer system queue manager to limit a time that file exchange messages may be kept in the receiver client message queue before an intended destination user downloads the uploaded file or the file comprising the uploaded file fragments.

11. A programmable device comprising:
a processing means;
a memory in communication with the processing means, wherein the memory contains computer executable program code; and
a network interface in communication with the processing means and the memory and a hypertext transfer protocol data communication network;
wherein the processing means is executes the computer executable program code to serve hypertext markup language web pages through the hypertext transfer protocol data communication network to a sender client running a sender client web browser and a receiver client running a receiver client web browser;
wherein the sender client has a local file system and the receiver client has a local file system, the processing means is configured to execute the computer executable program code to:
provide a queuing system for file exchange messages received from the sender client and intended for the receiver client, the queuing system without access to the processing means local file system and comprising a sender client message queue and a receiver client message queue;
upload and queue the plurality of successive file fragments received from the sender client web browser socket connection into the receiver client message queue;
if both the sender client and the receiver client are online and upon request by the receiver client, cause each of the uploaded file fragments to be directly forwarded to the receiver client web socket concurrently with receipt from the sender client web browser socket; and
if the receiver client is not online, fully upload a file comprising the plurality of successive file fragments, keep the uploaded file in the receiver client message queue without storing the uploaded file in the memory local file system and download the uploaded file to the receiver client web browser socket in response to a user log in and download request;
wherein the receiver client web browser socket is enabled to download the uploaded file and the uploaded file fragments from the receiver client message queue without gaining access rights to the memory, local file system or to the sender client local file system and without requiring a defining of a common area in the sender client local file system, the receiver client local file system or the memoir local file system: and wherein, if the sender client and the receiver client are connected at the same time to the processing means and an upload rate of the sender client is synchronous to a download rate of the receiver client, the processing means is configured to transfer a plurality of successive fragments of a file concurrently with their receipt from a socket connection of the sender client web browser to a socket connection of the receiver client web browser without first uploading an entirety of the file to a local file system of the memory and without storing the plurality of successive file fragments in the local file system of the memory.

12. The programmable device of claim 11, wherein the processing means further executes the computer readable program code to provide an authenticator module responsible for managing authentication of users that connect through the sender client or the receiver client to the processing means by interacting with a user's database comprising registered user fields, the user fields including at least one of a user password and a flag indicating that a user is currently online or offline.

13. The programmable device of claim 12, wherein the processing means further executes the computer readable program code to provide a queue manager module adapted to manage the queuing system;
wherein the receiver client message queue includes each of a plurality of records for each of a plurality of file exchange messages received by the processing means from one or more sender clients, each of the records including a sender field containing a user identifier, a file field indicating where the uploaded file or the file fragments are stored, and a file descriptor field indicating at least one of a file name, a file size, a time of upload from the sender client to the receiver client message queue and a maximum time to be kept in the queue.

14. The programmable device of claim 13, wherein the processing means queue manager is further configured to limit a file size of the uploaded file or of the file comprising the uploaded file fragments that can be exchanged through the receiver client message queue to a size of a space available on at least one of the sender client local system and the receiver client local system.

15. The programmable device of claim 14, wherein the processing means queue manager is further configured to limit a time that file exchange messages may be kept in the receiver client message queue before an intended destination user downloads the uploaded file or the file comprising the uploaded file fragments.

* * * * *